US012567384B2

(12) United States Patent
Mazrouei et al.

(10) Patent No.: US 12,567,384 B2
(45) Date of Patent: Mar. 3, 2026

(54) CIRCUIT DEVICE AND DISPLAY SYSTEM

(71) Applicant: SEIKO EPSON CORPORATION, Tokyo (JP)

(72) Inventors: Sebdani mahmood Mazrouei, Markham (CA); Kumar anandabairavasamy Anand, Richmond (CA); Stanislav Zaozerskii, Markham (CA)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/756,207

(22) Filed: Jun. 27, 2024

(65) Prior Publication Data

US 2025/0006142 A1 Jan. 2, 2025

(30) Foreign Application Priority Data

Jun. 28, 2023 (JP) ................................ 2023-105859

(51) Int. Cl.
*G09G 3/34* (2006.01)
*G09G 3/36* (2006.01)

(52) U.S. Cl.
CPC ............ *G09G 3/3426* (2013.01); *G09G 3/36* (2013.01); *G09G 2320/0233* (2013.01); *G09G 2320/0242* (2013.01); *G09G 2320/0646* (2013.01); *G09G 2360/16* (2013.01)

(58) Field of Classification Search
CPC ......... G09G 3/3406–3426; G09G 3/36; G09G 2320/0233; G09G 2320/0242; G09G 2320/0646; G09G 2360/16
See application file for complete search history.

(56) References Cited

U.S. PATENT DOCUMENTS

| | | | | |
|---|---|---|---|---|
| 8,576,159 B2 * | 11/2013 | Cho | G09G 3/3426 345/102 |
| 9,153,044 B2 * | 10/2015 | Suyama | G09G 3/3611 |
| 10,522,095 B2 * | 12/2019 | Yata | G09G 3/3208 |
| 11,087,714 B2 * | 8/2021 | Ko | G09G 5/14 |
| 12,100,361 B1 * | 9/2024 | Furihata | G09G 3/3406 |
| 12,136,398 B2 * | 11/2024 | Furihata | G09G 3/3426 |

(Continued)

FOREIGN PATENT DOCUMENTS

| | | |
|---|---|---|
| JP | 2019-028102 A | 2/2019 |
| KR | 2017-0026024 A | 3/2017 |

*Primary Examiner* — Gene W Lee
(74) *Attorney, Agent, or Firm* — Harness, Dickey & Pierce, P.L.C.

(57) ABSTRACT

A circuit device includes a luminance analysis circuit, a dimming circuit, and an area boosting circuit. The luminance analysis circuit luminance analyzes image data of an input image to output luminance information. The dimming circuit determines light source luminance information indicating light emission luminance at which each light source element of the plurality of light source elements emits light in accordance with the luminance information. The area boosting circuit performs an area boosting process on the dimming circuit. The area boosting process is a process in which the light emission luminance of the light source element corresponding to a first area is higher when the area boosting process is performed on the first area of the input image than when the area boosting process is not performed on the first area.

17 Claims, 13 Drawing Sheets

(56) References Cited

U.S. PATENT DOCUMENTS

| | | | | |
|---|---|---|---|---|
| 12,334,027 | B2 * | 6/2025 | Furihata | G09G 3/3426 |
| 2009/0295841 | A1 | 12/2009 | Park et al. | |
| 2010/0277514 | A1 | 11/2010 | Yeo et al. | |
| 2010/0289833 | A1 * | 11/2010 | Budzelaar | G09G 3/3426<br>345/102 |
| 2011/0141077 | A1 * | 6/2011 | Cho | G09G 3/3426<br>345/207 |
| 2012/0281028 | A1 * | 11/2012 | Orlick | G09G 3/3426<br>345/102 |
| 2017/0047022 | A1 * | 2/2017 | Ikeda | G09G 3/3413 |
| 2017/0084232 | A1 * | 3/2017 | Yang | G09G 3/3426 |
| 2020/0013346 | A1 * | 1/2020 | Hong | G09G 3/342 |
| 2021/0110788 | A1 * | 4/2021 | Ko | G09G 5/14 |

* cited by examiner

FIG. 8

| AREA | COEFFICIENT | EXAMPLE OF COEFFICIENT | AREA BOOSTING PROCESS |
|---|---|---|---|
| AR1 | CF1 | 1 | INTin × CF1 |
| AR2 | CF2 | 0.7 | INTin × CF2 |
| AR3 | CF3 | 0.5 | INTin × CF3 |
| AR4 | CF4 | 1 | INTin × CF4 |
| AR5 | CF5 | 0.1 | INTin × CF5 |

| AREA | INITIAL VALUE OF LIGHT EMISSION LUMINANCE | EXAMPLE OF INITIAL VALUE | LIGHT EMISSION LUMINANCE AFTER DIMMING |
|---|---|---|---|
| AR1 | BOOST LUMINANCE VALUE | MAXIMUM VALUE | BOOST LUMINANCE VALUE |
| AR2 | BOOST LUMINANCE VALUE | MAXIMUM VALUE | BOOST LUMINANCE VALUE |
| AR3 | 0 | 0 | DETERMINED BY DIMMING |

CIRCUIT DEVICE AND DISPLAY SYSTEM

The present application is based on, and claims priority from JP Application Serial Number 2023-105859, filed Jun. 28, 2023, the disclosure of which is hereby incorporated by reference herein in its entirety.

BACKGROUND

1. Technical Field

The present disclosure relates to a circuit device, a display system, and the like.

2. Related Art

JP-A-2019-028102 discloses an image display device aimed at improving the visibility of a specific image. The image display device includes a display control unit. The display control unit controls the light source so that the luminance of the light emitting area other than the first light emitting area corresponding to the first display area of the liquid crystal panel is lower than the luminance of the first light emitting area. The display control unit also controls the liquid crystal panel so that the transmittance of pixels other than the pixels in the first display area of the liquid crystal panel is smaller than the transmittance of pixels in the first display area, and increases as the distance from the first display area increases.

In JP-A-2019-028102, the display control unit controls the luminance of the light source in light emitting area other than the first light emitting area corresponding to the first display area of the liquid crystal panel, regardless of the display image. For this reason, even when the display image changes in an area other than the first display area, the luminance of the corresponding light source does not change, so that the light cannot be adjusted appropriately for the display image. Therefore, there is a problem that display quality in an area other than the first display area is poor.

SUMMARY

According to an aspect of the present disclosure, in a circuit device that controls a display device includes a plurality of light source elements and a display panel, the circuit device includes a luminance analysis circuit that luminance analyzes image data of an input image to output luminance information, a dimming circuit that determines light source luminance information indicating light emission luminance at which each light source element of the plurality of light source elements emits light in accordance with the luminance information, and an area boosting circuit that performs an area boosting process on the dimming circuit so that light emission luminance of a light source element corresponding to a first area is higher when the area boosting process is performed on the first area of the input image than when the area boosting process is not performed on the first area.

According to another aspect of the present disclosure, a display system includes the above circuit device and the display device.

According to still another aspect of the present disclosure, a display system includes a display device including a plurality of light source elements and a display panel, and a display controller that controls the display device, wherein the display controller sets light emission luminance of a light source element corresponding to a first area, of a display panel, in which a predetermined icon is displayed to high luminance, and local dimming control light emission luminance of a light emitting element corresponding to a second area, of the display panel, in which the predetermined icon is not displayed based on image data of an input image of the display controller.

BRIEF DESCRIPTION OF THE DRAWINGS

FIG. 8 shows an example of area boost.

DESCRIPTION OF EMBODIMENTS

Hereinafter, preferred embodiments of the present disclosure will be described in detail. Note that the present embodiment described below does not unduly limit the content described in the claims, and not all of the configurations described in the present embodiment are essential components.

1. Electronic Device, Display Systems and Circuit Devices

Figure 1:
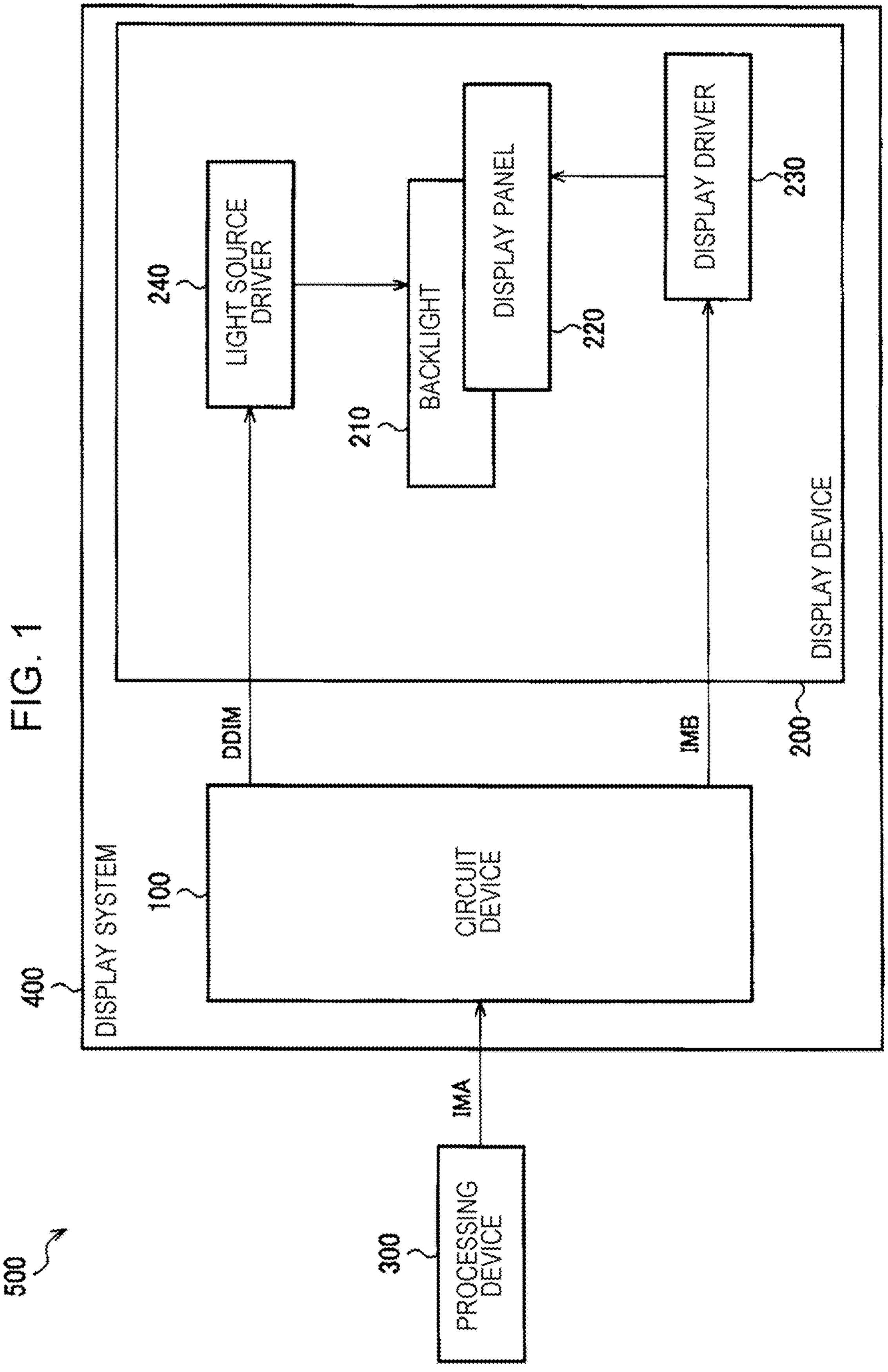
FIG. 1 shows a configuration example of an electronic device.

FIG. 1 is a configuration example of an electronic device including a display system of the present embodiment. An electronic device 500 includes a processing device 300 and a display system 400. The electronic device 500 is, as an example, an in-vehicle display device including a meter panel, a center information display, a head-up display, or an electronic mirror, a television device, or an information processing device including a display.

The display system 400 includes a circuit device 100 and a display device 200. The circuit device 100 is, for example, an integrated circuit device in which a plurality of circuit elements is integrated on a semiconductor substrate. Note that although the circuit device 100 and the display device 200 are shown as separate components in FIG. 1, the circuit device 100 may be included in the display device 200.

The display device 200 includes a backlight 210, a display panel 220, a display driver 230, and a light source driver 240. An example of the display device 200 includes a display used in a television device, an information processing device, or the like. Alternatively, examples of the display device 200 may include a head-mounted display including an eye projection device, a head-up display including a screen projection device, and the like. When display device 200 is a head-up display, display device 200 further includes an optical system for projecting light emitted from the backlight 210 and transmitted through the display panel 220 onto a screen.

In plan view of the backlight 210, light source elements are two-dimensionally disposed in the backlight 210. The light source element is a light emitting element that emits light when supplied with electric power, and is, for example, an inorganic light emitting diode or an organic light emitting diode. In local dimming control, the amount of light of each two-dimensionally disposed light source element is controlled independently of each other. Alternatively, the backlight 210 may be divided into a plurality of areas. In plan view, a plurality of light source elements is disposed in each area. The light source elements disposed within the area are controlled to have the same amount of light, and the amount of light of each area is controlled independently of each other.

An example of a two-dimensional arrangement of light source elements is a square arrangement in which light source elements are disposed at all intersections of a plurality of rows and a plurality of columns. However, the two-dimensional arrangement is not limited to a square arrangement. For example, the two-dimensional arrangement may be an arrangement called a diamond arrangement or a staggered arrangement. In this arrangement, light source elements are disposed at the intersections between one of the odd rows and the even rows and the odd columns, and at the intersections between the other of the odd rows and the even rows and the even columns, and no light source elements are disposed at the other intersections.

The light source driver 240 receives light source luminance data DDIM from the circuit device 100 and drives each light source element of the backlight 210 based on the light source luminance data DDIM. The light source driver 240 is, for example, an integrated circuit device. Note that a plurality of light source drivers may be provided, and respective light source drivers may be separate integrated circuit devices.

The display panel 220 is an electro-optical panel that transmits light from the backlight 210 and displays an image by controlling its transmittance. For example, the display panel 220 is a liquid crystal display panel.

The display driver 230 receives image data IMB and a timing control signal for controlling display timing from the circuit device 100. The display driver 230 displays an image on the display panel 220 by driving the display panel based on the received image data IMB and the received timing control signal.

The processing device 300 transmits image data IMA to the circuit device 100. The processing device 300 is a processor such as a CPU, a GPU, a microcomputer, a DSP, an ASIC, or an FPGA. The CPU is an abbreviation for a central processing unit. The GPU is an abbreviation for a graphics processing unit. The DSP is an abbreviation for a digital signal processor. The ASIC is an abbreviation for an application specific integrated circuit. The FPGA is an abbreviation for a field programmable gate array.

The circuit device 100 receives the image data IMA and performs local dimming control of the display device 200 based on the image data IMA. The circuit device 100 dims the light emission luminance of each light source element or each area of the backlight 210 according to the luminance of the image data IMA, and outputs the light source luminance information obtained by the dimming as the light source luminance data DDIM to the light source driver 240. Further, the circuit device 100 performs color correction on the image data IMA based on the light source luminance information to output the image data IMB after color correction to the display driver 230.

Further, the circuit device 100 has a built-in display controller function. That is, the circuit device 100 transmits the image data IMB and the timing control signal for controlling display timing to the display driver 230. Further, the circuit device 100 may perform image processing such as gradation correction, white balance correction, or enlargement/reduction on the image data IMA or the image data IMB. Note that the circuit device 100 may not have a built-in display controller function, but the display controller may be provided as an integrated circuit device separate from the circuit device 100. In this case, the display controller may be included in the display device 200. Furthermore, the display controller and the display driver 230 may be configured with respective integrated circuit devices, or may be configured with an integrated circuit device.

2. Configuration Example of Circuit Device

In the following, illustrations and descriptions of the display controller function built in the circuit device 100 will be omitted, and dimming and color correction will be illustrated and described.

Figure 2:
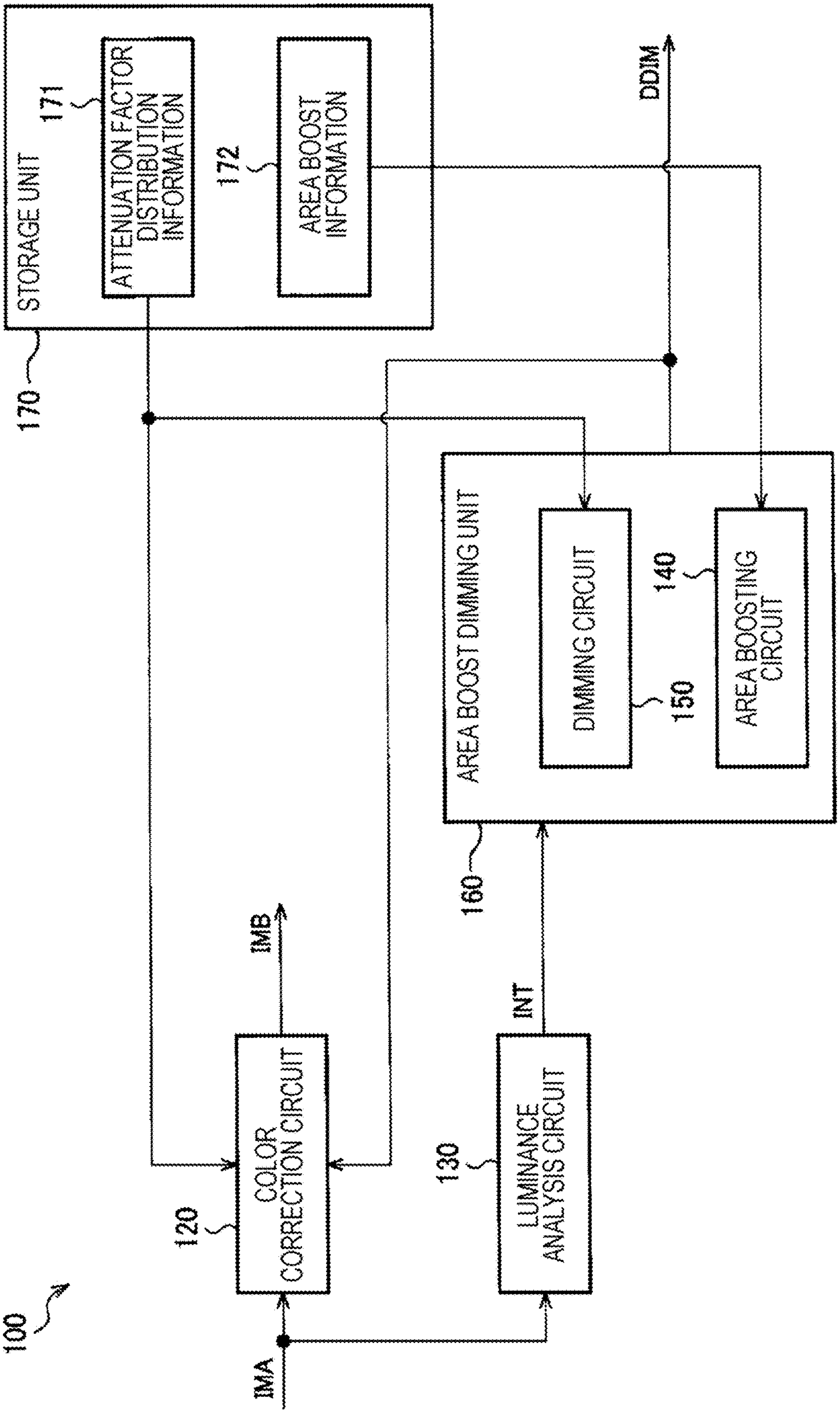
FIG. 2 shows a configuration example of a circuit device.

FIG. 2 shows an example of the configuration of a circuit device. The circuit device 100 includes a color correction circuit 120, a luminance analysis circuit 130, an area boost dimming unit 160, and a storage unit 170.

The storage unit 170 stores attenuation factor distribution information 171 and area boost information 172. The storage unit 170 is a register or a memory. The memory is volatile memory such as a RAM, or nonvolatile memory such as an OTP memory or an EEPROM. The RAM is an abbreviation for a random access memory. The OTP is an abbreviation for one time programmable. The EEPROM is an abbreviation for an electrically erasable programmable read only memory.

The attenuation factor distribution information 171 indicates the attenuation factor distribution of light reaching the display panel from the light source element. The attenuation factor distribution indicates the relationship between the distance from the light source element to the pixel and the attenuation factor of the light with which the light source element illuminates the pixel. The attenuation factor distribution is also referred to as an attenuation characteristic or a luminance distribution. The attenuation factor distribution information 171 is, for example, a lookup table or a function indicating the attenuation factor distribution. When the function is a polynomial, the attenuation factor distribution information 171 may be a coefficient of each term of the polynomial.

The area boost information 172 is used for an area boosting process, which will be described later. The area boost information 172 includes information designating an area to be boosted. The area boost information 172 may include boost control information about each area. The boost control information is, for example, coefficient information 172*a* described later in FIG. 6 or initial value information 172*b* described later in FIG. 9.

The circuit device 100 receives the image data IMA from the processing device 300 through an image interface (not shown). The image represented by the image data IMA will be referred to as an input image. The image interface method may be various methods such as an LVDS, a parallel RGB method, or a display port. The LVDS is an abbreviation for low voltage differential signaling.

Figure 3:
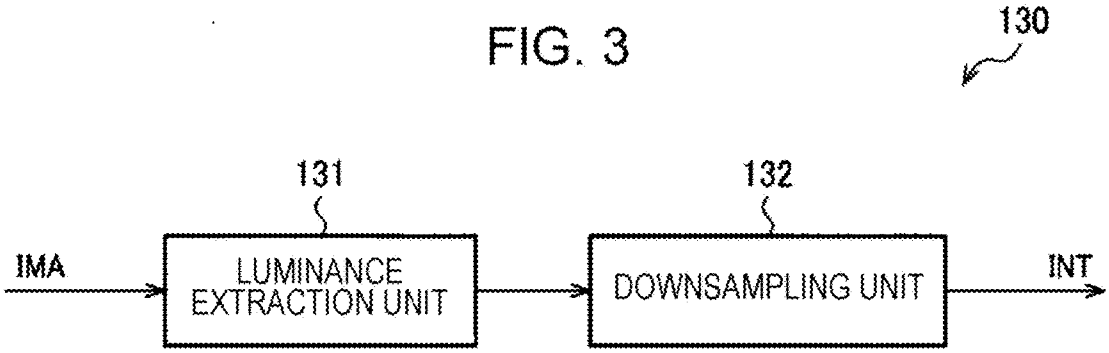
FIG. 3 shows a detailed configuration example of a luminance analysis circuit.

The received image data IMA is input to the luminance analysis circuit 130. The luminance analysis circuit 130 analyzes the luminance of the image data IMA to output the result as luminance information INT. The luminance information indicates the luminance of the image at each position of the input image. FIG. 3 shows a detailed configuration example of the luminance analysis circuit. The luminance analysis circuit 130 includes a luminance extraction unit 131 and a downsampling unit 132.

The input image is an RGB color image. That is, each pixel of the image data IMA has an R pixel value, a G pixel value, and a B pixel value. The luminance analysis circuit 130 sets the maximum value among the R pixel value, the G pixel value, and the B pixel value as the luminance value of the pixel. As a result, a first luminance image in which each pixel has one luminance value is obtained.

The downsampling unit 132 obtains a second luminance image by downsampling the first luminance image. The number of pixels of the second luminance image is smaller than the number of pixels of the first luminance image. It is sufficient that downsampling is performed in at least one of the horizontal scanning direction and the vertical scanning direction. As an example, the number of pixels is downsampled to ½ or less in both the horizontal scanning direction and the vertical scanning direction. The downsampling unit 132 outputs the second luminance image as the luminance information INT.

Note that the configuration of the luminance analysis circuit 130 is not limited to the above. For example, the downsampling unit 132 may be omitted and the first luminance image may be output as the luminance information INT.

The area boost dimming unit 160 performs dimming of the backlight 210 in local dimming control, and boosts the amount of light of the light source element corresponding to a specific area of the input image. The area boost dimming unit 160 includes an area boosting circuit 140 and a dimming circuit 150.

The dimming circuit 150 generates light source luminance information indicating the light emission luminance of each light emitting element based on the luminance information INT to output the light source luminance information as the light source luminance data DDIM. Specifically, the dimming circuit 150 determines the light emission luminance of each light source element by performing a dimming process using the luminance information INT and the attenuation factor distribution information 171 stored in the storage unit 170. Details of this method will be described later. Alternatively, the dimming circuit 150 determines the maximum luminance of the pixels belonging to the image area corresponding to the light emitting elements of the backlight 210 based on the luminance information INT. The dimming circuit 150 determines the minimum light emission luminance within a range in which the display device 200 can display the maximum luminance, and sets the minimum light emission luminance as the light emission luminance of the light emitting element.

The area boosting circuit 140 performs an area boosting process on the dimming circuit 150 based on the area boost information 172 stored in the storage unit 170. Each light source element of the backlight 210 is locally dimming controlled by the dimming circuit 150. At this time, the area boosting circuit 140 performs the area boosting process so that the light emission luminance of the light source element corresponding to the specific area is higher than the light emission luminance when the area boosting process is not performed. The area boosting process is performed by controlling the input to the dimming circuit 150 or by controlling the dimming process on the dimming circuit 150. The light emission luminance of the light emitting element corresponding to an area other than the specific area is determined by dimming using normal local dimming control. The detailed example of the area boosting process will be described with reference to FIGS. 6 to 8 and 9 to 11.

The color correction circuit 120 calculates illumination luminance information based on the light source luminance data DDIM and the attenuation factor distribution information 171 stored in the storage unit 170. The illumination luminance information indicates the illumination luminance of each pixel of the display panel 220 when the display panel 220 is illuminated by the backlight 210. Details of the calculation of illumination luminance will be described later with reference to FIG. 14. The color correction circuit 120 performs color correction on the image data IMA based on the illumination luminance information to output the corrected image data IMB. Specifically, the color correction circuit 120 multiplies the pixel data of each pixel by the reciprocal of the luminance of the light that reaches the pixel, and sets the result as new pixel data of the pixel. Note that the image represented by the image data IMB will be referred to as an output image.

The circuit device 100 transmits the image data IMB of the output image to the display driver 230 via an image interface (not shown). The image interface method may be various methods such as an LVDS, a parallel RGB method, or a display port.

Note that the color correction circuit 120, the luminance analysis circuit 130, the area boosting circuit 140, and the dimming circuit 150 are logic circuits that process digital signals. The color correction circuit 120, the luminance analysis circuit 130, the area boosting circuit 140, and the dimming circuit 150 may be configured by respective logic circuits, or some or all of them may be configured by an integrated logic circuit. Alternatively, the functions of these circuits may be implemented by the processor such as a DSP executing an instruction set or programs in which the functions of the color correction circuit 120, the luminance analysis circuit 130, the area boosting circuit 140, and the dimming circuit 150 are described.

Alternatively, the circuit device 100 may be a processor such as a CPU, a GPU, a microcomputer, a DSP, an ASIC, or an FPGA. The functions of the circuit device 100 may be implemented by the processor executing an instruction set or programs in which the functions of respective components of the circuit device 100 are described.

Figure 4:
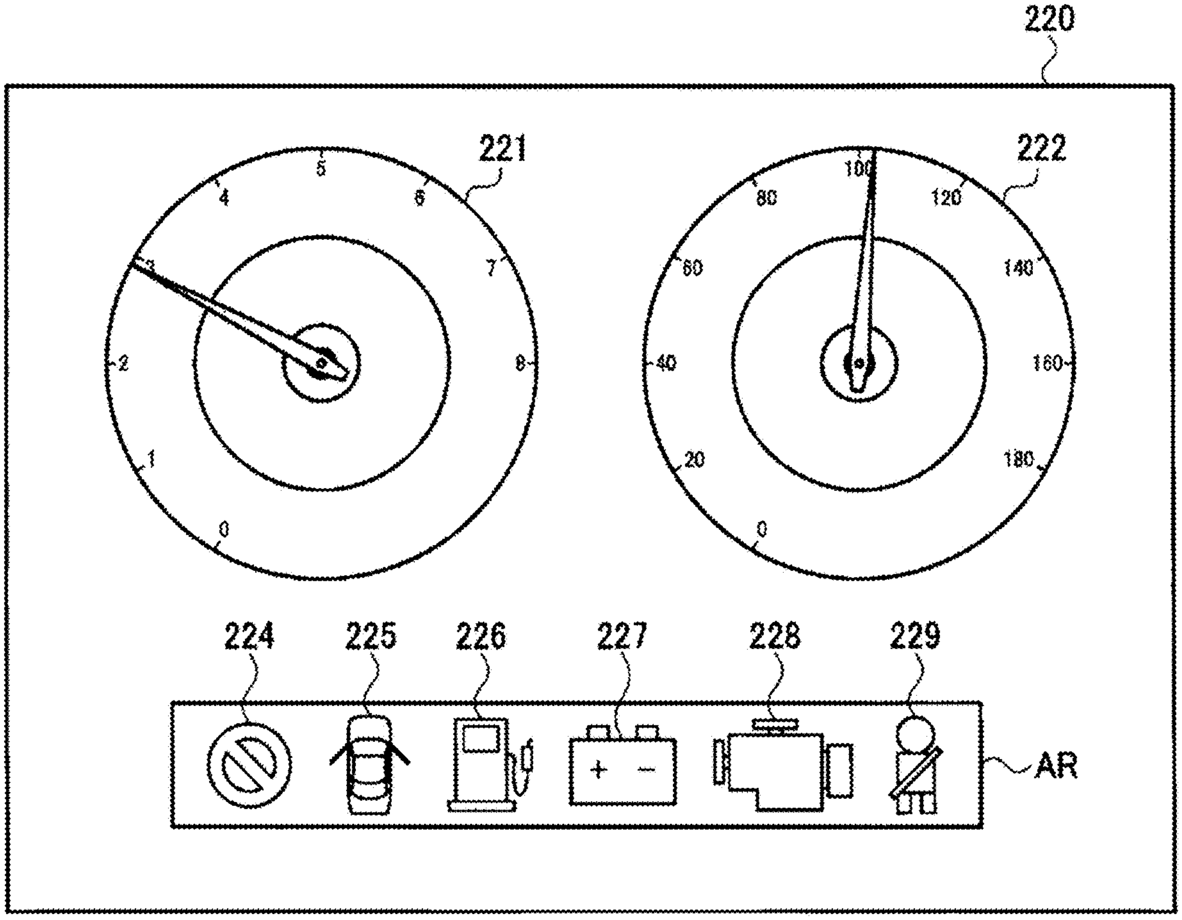
FIG. 4 shows an example of an image displayed on a display panel and an area to be area boosted.

FIG. 4 shows an example of an image displayed on the display panel and an area to be area boosted. Here, an example is shown in which the display device 200 is an in-vehicle cluster panel.

The display panel 220 displays an image including meters 221, 222 and warning light icons 224-229. The background is black as an example, but is not limited thereto. An area AR to be area boosted is an area including the icons 224 to 229. Note that an area may be set individually for each icon. Further, the area AR may be an area including only some of the icons 224 to 229.

Figure 5:
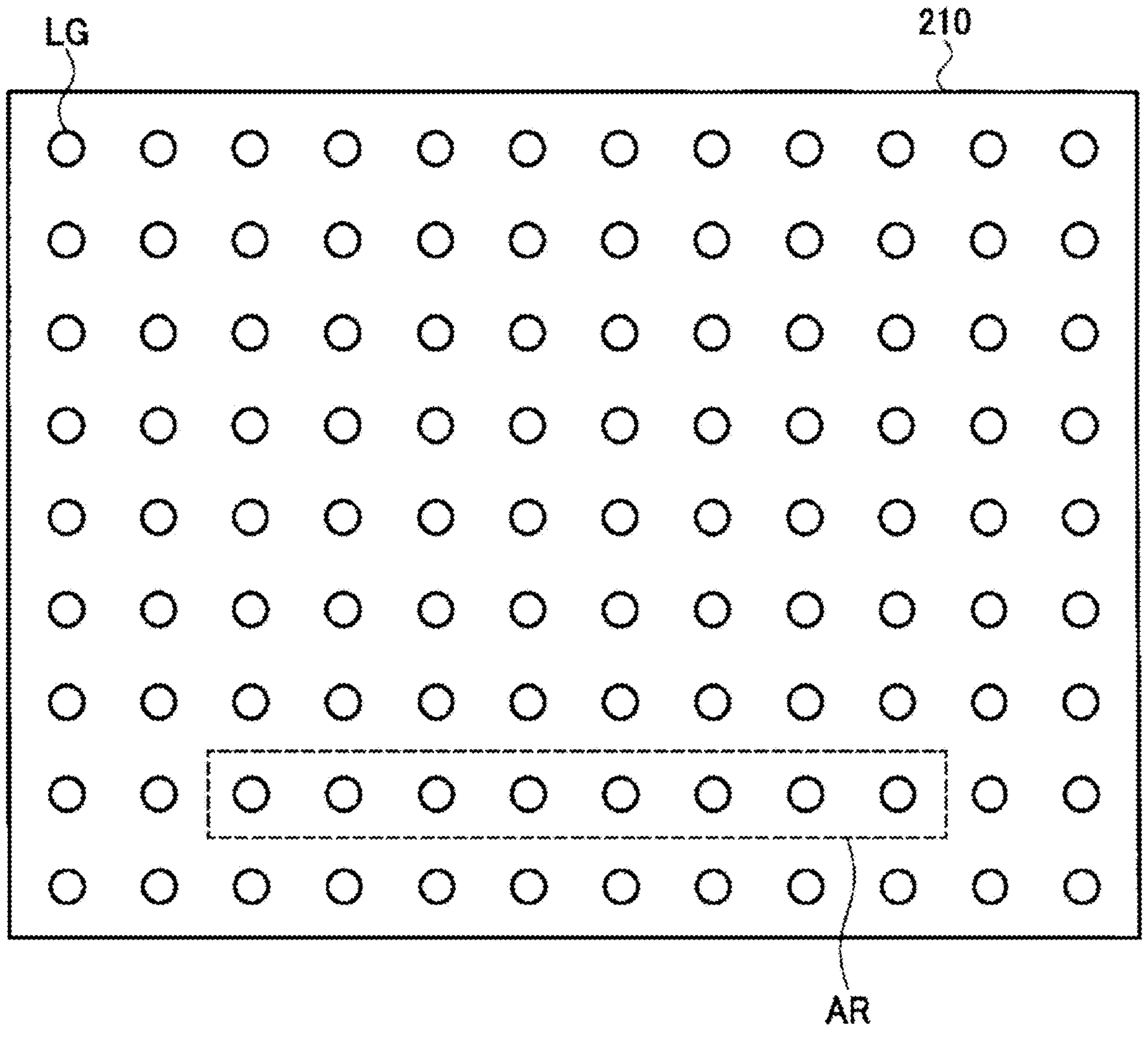
FIG. 5 is a diagram describing the relationship between backlight and area boost.

FIG. 5 is a diagram describing the relationship between backlights and area boost. The backlight 210 includes a plurality of light source elements LG disposed two-dimensionally in plan view. Among the plurality of light source elements LG, the light emission luminance of the light source elements corresponding to the area AR is boosted. The light source element corresponding to the area AR is a light source element that is disposed to overlap the area AR on the display panel 220 in plan view of the display panel 220 and the backlight 210. For example, the storage unit 170 stores a correspondence between the coordinates of a pixel in an image and the position of each light source element. The light source element to be boosted is identified based on this correspondence information and information designating the area AR.

In the present embodiment, the circuit device 100 controls the display device 200 including the plurality of light source elements LG and the display panel 220. Circuit device 100 includes the luminance analysis circuit 130, the dimming circuit 150, and the area boosting circuit 140. The luminance analysis circuit 130 analyzes the luminance of the image data IMA of the input image to output the luminance information INT. The dimming circuit 150 determines light source luminance information indicating the light emission luminance at which each light source element of the plurality of light source elements LG emits light in accordance with the luminance information INT. The area boosting circuit 140 performs the area boosting process on the dimming circuit 150. The area boosting process is a process in which the light emission luminance of the light source element LG corresponding to the first area is higher when the area boosting process is performed on the first area of the input image than when the area boosting process is not performed on the first area.

According to the present embodiment, the light source element corresponding to the first area has a higher light emission luminance by the area boosting process, so that the image of the first area is displayed brightly. This enhances the visibility of the image in the first area even in an environment and the like where the surroundings are bright. The light emission luminance of the light source element corresponding to the area on which the area boosting process is not performed is determined by the dimming circuit 150 in accordance with the luminance information INT of the image data IMA. As a result, the light is adjusted appropriately for the display image, so that the display quality of the image is good in the area on which the area boosting process is not performed.

Note that the first area corresponds to the AR in FIGS. 4 and 5. Alternatively, the first area corresponds to either an AR1 to an AR4 in FIG. 7, which will be described later, or AR1 or AR2 in FIG. 10, which will be described later.

Further, in the present embodiment, when the area boosting circuit 140 determines that a predetermined icon is displayed in the first area, the area boosting circuit 140 may perform the area boosting process on the first area.

For example, the processing device 300 transmits icon display ON/OFF information to the circuit device 100, and the area boosting circuit 140 determines whether a predetermined icon is displayed in the first area based on the ON/OFF information. Alternatively, the area boosting circuit 140 may determine whether an icon is displayed in the first area based on the image data IMA or the luminance information INT of the first area.

According to the present embodiment, when an icon is displayed in the first area, the visibility of the icon is enhanced by area boosting. On the other hand, when no icon is displayed in the first area, area boosting is not performed, so that the light emission luminance of the light source element corresponding to the first area is suppressed, and the occurrence of, for example, a halo is suppressed. The halo is a phenomenon in which when light leaks from the periphery of an icon or a character, the periphery of the icon or the character appears vaguely bright.

Further, in the present embodiment, the area boosting circuit 140 does not need to perform the area boosting process on the first area when the first area is displayed in black.

For example, the area boosting circuit 140 determines whether the first area is displayed in black by determining whether the image data IMA or the luminance information INT of the first area is completely black.

According to the present embodiment, the area boosting circuit 140 can determine that a predetermined icon is displayed in the first area when the first area is not displayed in black, and can perform the area boosting process on the first area. On the other hand, the area boosting circuit 140 determines that the predetermined icon is not displayed in the first area when the first area is displayed in black, and does not perform the area boosting process on the first area.

Further, in the present embodiment, the display system 400 includes the display device 200 including the plurality of light source elements LG and the display panel 220, and the display controller that controls the display device 200. The display controller sets the light emission luminance of the light source element LG corresponding to the first area, of the display panel 220, in which the predetermined icon is displayed to high luminance. The display controller performs local dimming control of the light emission luminance of the light emitting element corresponding to the second area, of the display panel 220, where the predetermined icon is not displayed, based on the image data IMA of the input image of the display controller. Note that the display controller here corresponds to the circuit device 100 of the present embodiment.

According to the present embodiment, the light source element corresponding to the first area in which the predetermined icon is displayed is set to high luminance, so that the predetermined icon in the first area is displayed brightly. This enhances the visibility of the image in the first area even in an environment and the like where the surroundings are bright. Then, the light emission luminance of the light source element corresponding to the second area where the predetermined icon is not displayed is locally dimming controlled based on the image data IMA. As a result, the light is adjusted appropriately for the display image, so that the display quality of the image is good in the second area where the predetermined icon is not displayed.

Further, in the present embodiment, the above-mentioned high luminance may be a fixed luminance value that does not depend on the image data IMA. For example, the high luminance may be a predetermined boost luminance value, which will be described later with reference to FIG. 11.

According to the present embodiment, the light emission luminance of the light source element corresponding to the first area in which the predetermined icon is displayed is a fixed luminance value that does not depend on the image data IMA. As a result, the light source element corresponding to the first area in which the predetermined icon is displayed can be set to high luminance without being affected by local dimming control.

3. First Detailed Configuration Example

Figure 6:
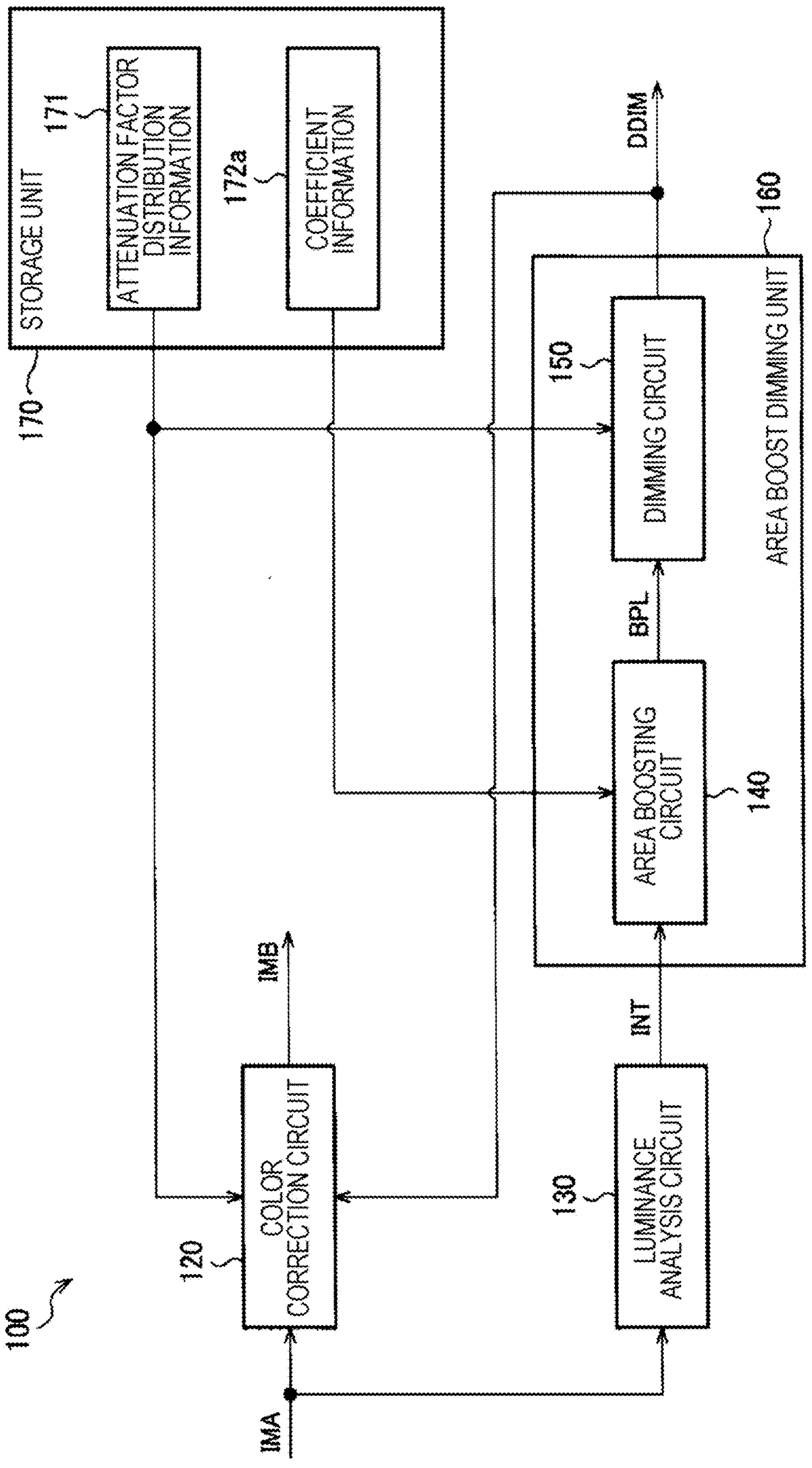
FIG. 6 shows a first detailed configuration example of a circuit device.

FIG. 6 shows a first detailed configuration example of the circuit device. The description of components similar to those in FIG. 2 will be omitted as appropriate. The operation of each component will be described below using the example of area boost shown in FIGS. 7 and 8. However, the number of areas to be boosted may be one or more.

Figure 7:
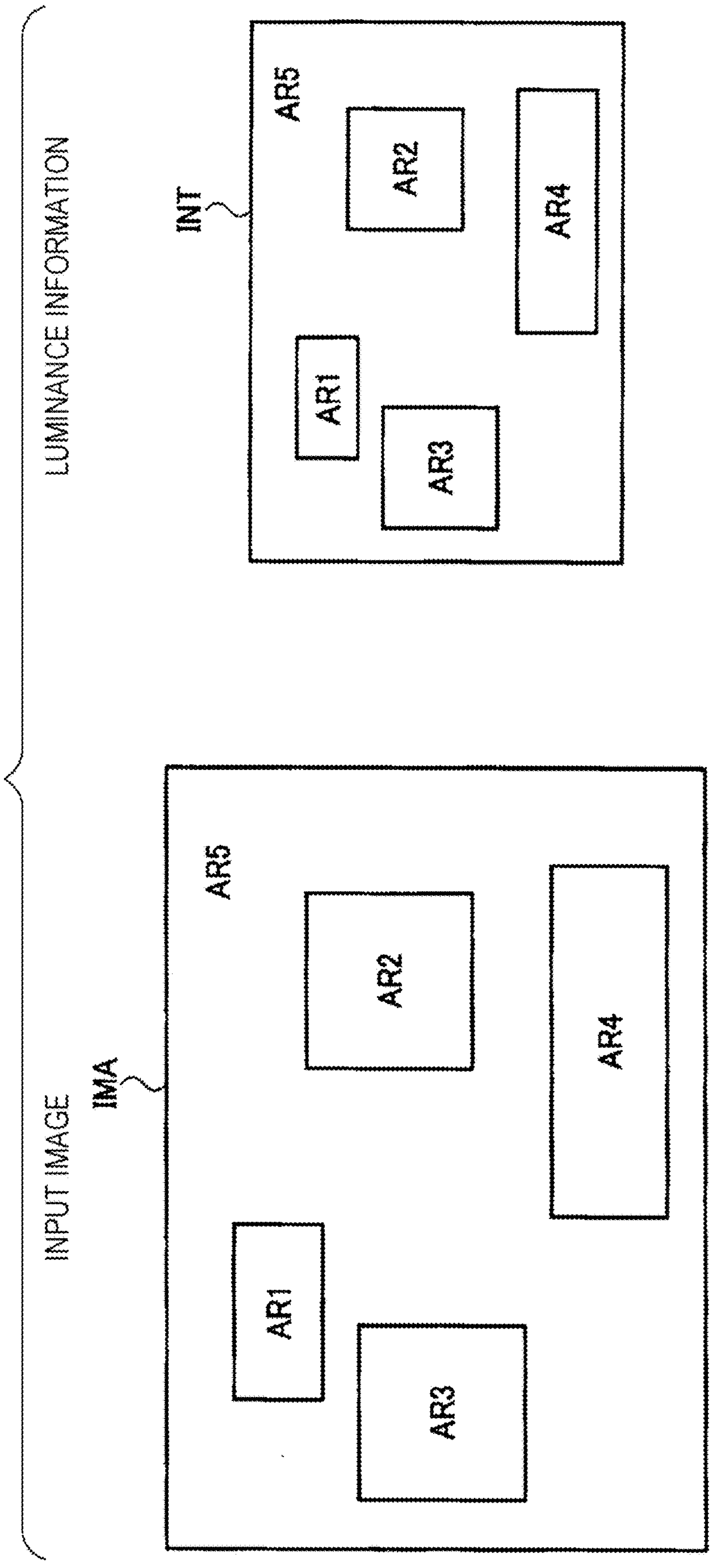
FIG. 7 shows an example of area boost.

As shown in FIG. 7, it is assumed that a first area AR1 to a fifth area AR5 are set for an input image based on the image data IMA. The first area AR1 to the fourth area AR4 are rectangular areas that do not overlap with each other. The fifth area AR5 is an area excluding the first area AR1 to the fourth area AR4 of the input image of one frame.

The luminance analysis circuit 130 outputs the down-sampled luminance information INT as described above. The first area AR1 to the fifth area AR5 of the luminance information INT are determined from the pixel number ratio between the input image and the luminance information INT. Note that although an example is shown in which the area is designated by coordinates on the input image, the area may be designated from the beginning by coordinates on the luminance information INT.

The storage unit 170 stores the coefficient information 172*a* as the area boost information 172. As shown in FIG. 8, the coefficient information 172*a* is a first coefficient CF1 to a fifth coefficient CF5 set for the first area AR1 to fifth area AR5, respectively. Each coefficient is greater than or equal to zero and less than or equal to one. FIG. 8 shows an example of coefficients. For example, a coefficient larger than 0.5 is set for an area where it is desired to boost the light emission luminance. On the contrary, a coefficient smaller than 0.5 is set for an area where it is desired to lower the light emission luminance. Note that the reference coefficient is not limited to 0.5. The area boosting circuit 140 multiplies the luminance information INT of each area by a coefficient based on the coefficient information 172*a* to output the result as the boosted luminance information BPL. Specifically, the coordinates of a pixel in the luminance information INT are set to (u, v), and the luminance value of the pixel set to INTin(u, v). u is a coordinate in the horizontal scanning direction, and v is a coordinate in the vertical scanning direction. It is assumed that p is an integer greater than or equal to one and less than or equal to five, and (u, v) belongs to the p-th area ARp. At this time, the area boosting circuit 140 calculates the luminance value INTout(u, v) of the pixel in the boosted luminance information BPL from INTout(u, v)=INTin(u, v)×CFp.

The dimming circuit 150 determines the light emission luminance of each light source element based on the boosted luminance information BPL and the attenuation factor distribution information 171. In dimming using local dimming control, the light emission luminance of the light emitting elements corresponding to the high luminance area of the image increases. Therefore, in an area where the luminance information INT is multiplied by a large coefficient, the light emission luminance of the light emitting element is high as a result of dimming. In this way, the light emission luminance of the light emitting element corresponding to a specific area such as an area where an icon is displayed is boosted.

Note that ON and OFF of the area boost function may be switchable by register settings or the like. When the area boost function is set to ON, the area boosting process is performed using the coefficients of each area as described above. When the area boost function is set to OFF, the area boosting circuit 140 does not perform coefficient multiplication, or the coefficients in all areas are set to the same value. Taking FIG. 8 as an example, when the area boost function is set to OFF, CF1=CF2=CF3=CF4=CF5=C is set. C is an any number greater than or equal to zero and less than or equal to one, and is, for example, 0.5.

In the present embodiment, the area boosting circuit 140 performs the area boosting process of multiplying the luminance information INT in a first area by a first coefficient, and multiplying the luminance information INT in a second area of the input image, the second area being different from the first area, by a second coefficient. The dimming circuit 150 determines light source luminance information based on the luminance information BPL after the area boosting process.

According to the present embodiment, by multiplying the luminance information INT of each area by a coefficient, the luminance information INT of the area is boosted, and the dimming process in local dimming control is performed based on the boosted luminance information BPL. As a result, the light is adjusted so that the light emission luminance of the light source element is increased in the area where the luminance of the image is boosted. Furthermore, since it is possible to vary the coefficients by which the luminance information INT of respective areas is multiplied, it is possible to vary the degrees of boost in respective areas. For an area that is not boosted, a corresponding coefficient can be set and the light emission luminance is not boosted for the area. In both the boosted area and the non-boosted area, the light emission luminance of the light source element is determined by the dimming process in local dimming control. Therefore, appropriate dimming is performed even for an area that is not boosted, and the display quality of the image is good.

Note that the first area here corresponds to any area of the AR1 to the AR5 in FIGS. 7 and 8, and the second area corresponds to any area of AR1 to AR5, the any area being other than the first area.

Further, in the present embodiment, the first coefficient may be larger than the second coefficient.

According to the present embodiment, the light emission luminance of light emission in the first area can be boosted more than the light emission luminance of light emission in the second area. This makes the visibility of the image in the first area relatively higher than that of the image in the second area.

Further, in the present embodiment, when the area boosting process is not performed, the first coefficient may have the same value as the second coefficient.

According to the present embodiment, since the first coefficient has the same value as the second coefficient, the degrees of boost in respective areas are the same. That is, the entire backlight 210 is dimmed by the dimming process in the local dimming control. In this way, the area boosting process can be turned OFF.

4. Second Detailed Configuration Example

Figure 9:
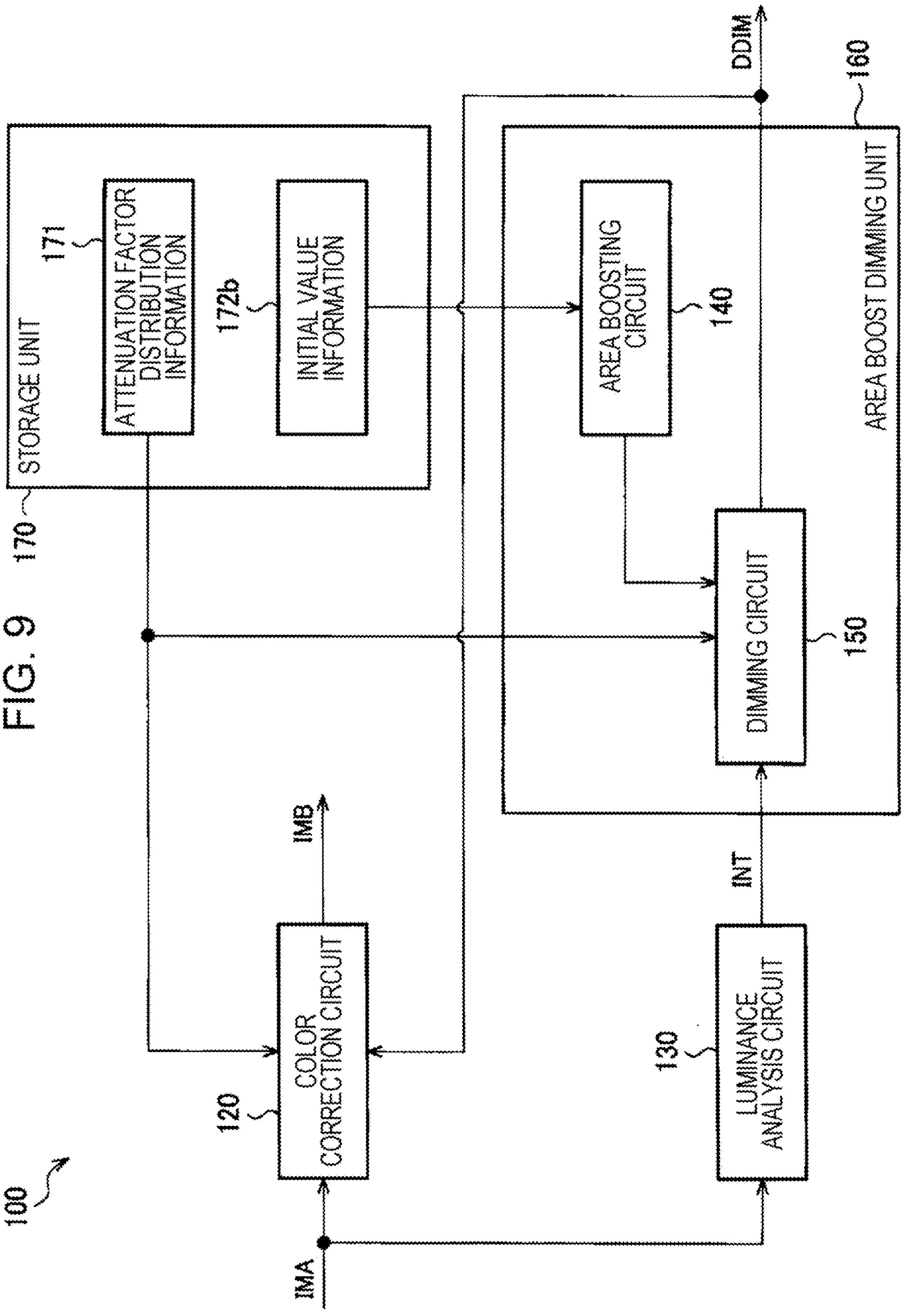
FIG. 9 shows a second detailed configuration example of a circuit device.

FIG. 9 shows a second detailed configuration example of the circuit device. The description of components similar to those in FIG. 2 will be omitted as appropriate. The operation of each component will be described below using the example of area boost shown in FIGS. 10 and 11. However, the number of areas to be boosted may be one or more.

Figures 10, 11:
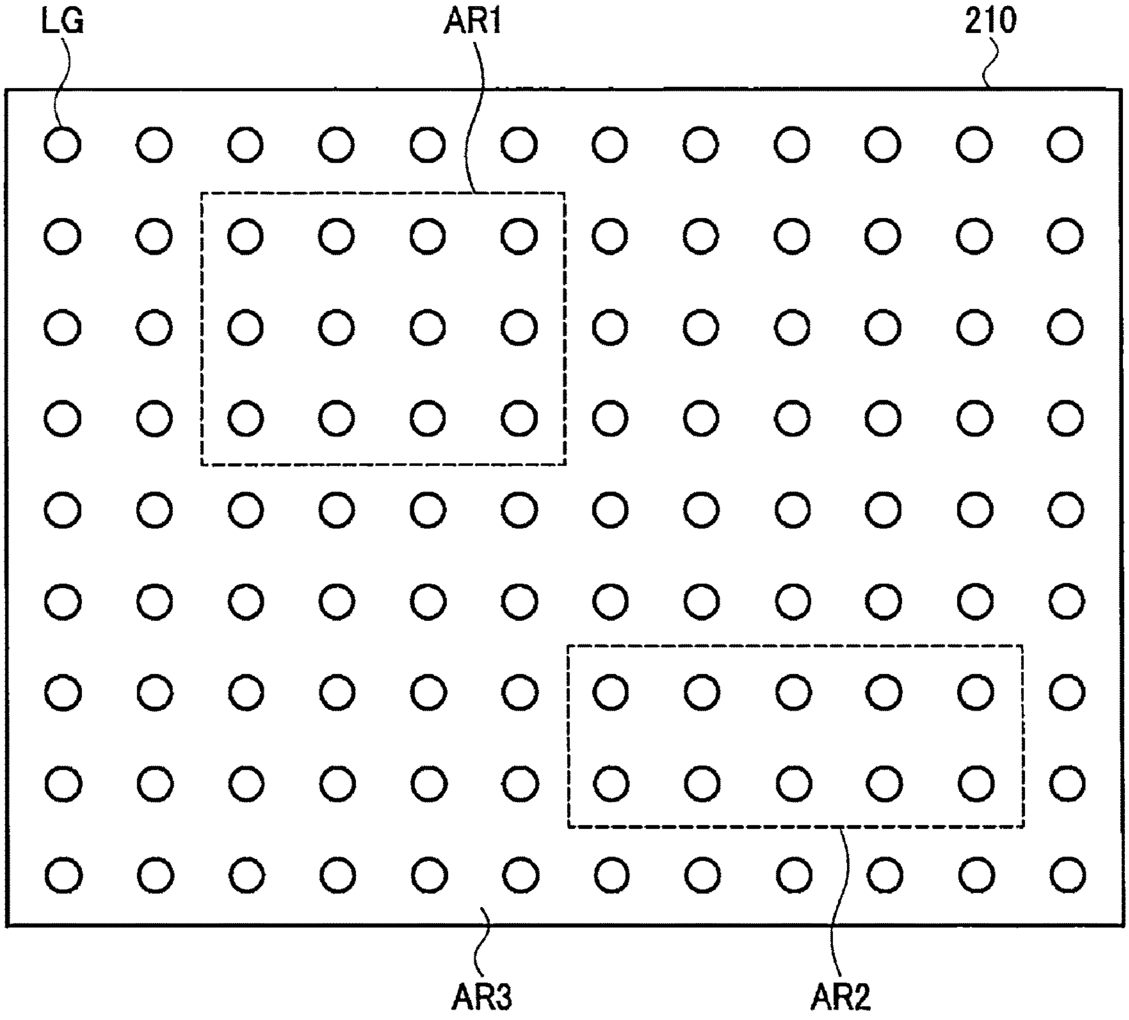
FIG. 10 shows an example of area boost.
FIG. 11 shows an example of area boost.

As shown in FIG. 10, it is assumed that a first area AR1 to a third area AR3 are set. The first area AR1 to the third area AR3 are set for the input image, and here, the position of each area is shown in correspondence with the position on the backlight 210. The third area AR3 is an area excluding the first area AR1 and the second area AR2 of the input image of one frame.

The storage unit 170 stores the initial value information 172*b* as the area boost information 172. As shown in FIG.

11, the initial value information 172*b* is the initial value of the light emission luminance set for each of the first area AR1 to the third area AR3. The initial values of the first area AR1 and the second area AR2 that are to be boosted are set to the boost luminance value, and the initial values of the third area AR3 that is not to be boosted are set to zero. An example of the boost luminance value is the maximum value among the luminance values that can be set as the light emission luminance of the light emitting element. However, the boost luminance value is only required to be high luminance and is not limited to the maximum value. Since the light emission luminance of the light emitting element in the area not to be boosted is determined by local dimming control, its initial value does not necessarily have to be zero.

The area boosting circuit 140 sets the initial value of the light emission luminance of each light source element in the dimming circuit 150 based on the initial value information 172*b*. That is, the initial value of the light emission luminance of the light source element corresponding to each of the first area AR1 and the second area AR2 is set to the boost luminance value, and the initial value of the light emission luminance of the light source element corresponding to the third area AR3 is set to zero.

The dimming circuit 150 determines the light emission luminance of each light emitting element based on the set initial value, the luminance information INT, and the attenuation factor distribution information 171. Specifically, the dimming circuit 150 does not change the light emission luminance of the light source elements in the first area AR1 and the second area AR2 whose initial value is set to the boost luminance value. That is, after dimming is performed by local dimming control, the light emission luminance of the light source elements in the first area AR1 and the second area AR2 is the boost luminance value. The dimming circuit 150 dims the light emission luminance of the light source elements in the third area AR3 whose initial value is set to zero based on the luminance information INT and the attenuation factor distribution information 171. Since the light source elements in the first area AR1 and the second area AR2 are fixed at the boost luminance value without being affected by local dimming, the luminance does not decrease due to local dimming. As a result, the light emission luminance of the light emitting element corresponding to a specific area such as an area where an icon is displayed is boosted.

Note that ON and OFF of the area boost function may be switchable by register settings or the like. When the area boost function is set to ON, the area boosting process is performed using the initial values of each area as described above. When the area boost function is set to OFF, the area boosting circuit 140 sets the initial value of the light emission luminance of all light source elements to zero. The dimming circuit 150 then dims the light emission luminance of all the light source elements based on the luminance information INT and the attenuation factor distribution information 171.

In the present embodiment, the area boosting circuit 140 performs the area boosting process of setting the light emission luminance of the light source element corresponding to the first area to a predetermined boost luminance value.

According to the present embodiment, by setting the light emission luminance of the light source element corresponding to the first area to the predetermined boost luminance value, the light emission luminance of the light source element corresponding to the first area is the predetermined boost luminance value without depending on the dimming process in the local dimming control. As a result, the light emission luminance of the light source element corresponding to the first area is boosted.

Note that the first area here corresponds to either the AR1 or the AR2 in FIGS. 10 and 11.

Further, in the present embodiment, the dimming circuit 150 fixes the light emission luminance of the light source element corresponding to the first area to a predetermined boost luminance value, and determines the light emission luminance of the light source element corresponding to a second area of the input image, the second area being different from the first area, in accordance with luminance information INT.

According to the present embodiment, the second area is an area on which the area boosting process is not performed, and the light emission luminance of the light source element corresponding to the second area is determined by the dimming circuit 150 in accordance with the luminance information INT of the image data IMA. As a result, the light is adjusted appropriately for the display image, so that the display quality of the image is good in the area on which the area boosting process is not performed.

Note that the first area here corresponds to either the AR1 or the AR2 in FIGS. 10 and 11, and the second area corresponds to the AR3.

Further, in the present embodiment, the predetermined boost luminance value may be the maximum value of the light emission luminance of the light source element.

According to the present embodiment, the light source element corresponding to the first area has the maximum value of the light emission luminance by the area boosting process. This makes it possible to maximize the visibility of the image in the first area even in an environment and the like where the surroundings are bright. Further, when the light emission luminance is determined by the dimming process described later with reference to FIG. 12, the light emission luminance is not dimmed in the direction of becoming darker, as described by the following equation (2). That is, when the light emission luminance is set to the maximum value as an initial value, the light emission luminance will remain at the maximum value even when a dimming process is performed on that light emitting element.

5. Dimming Circuit and Color Correction Circuit

Figure 12:
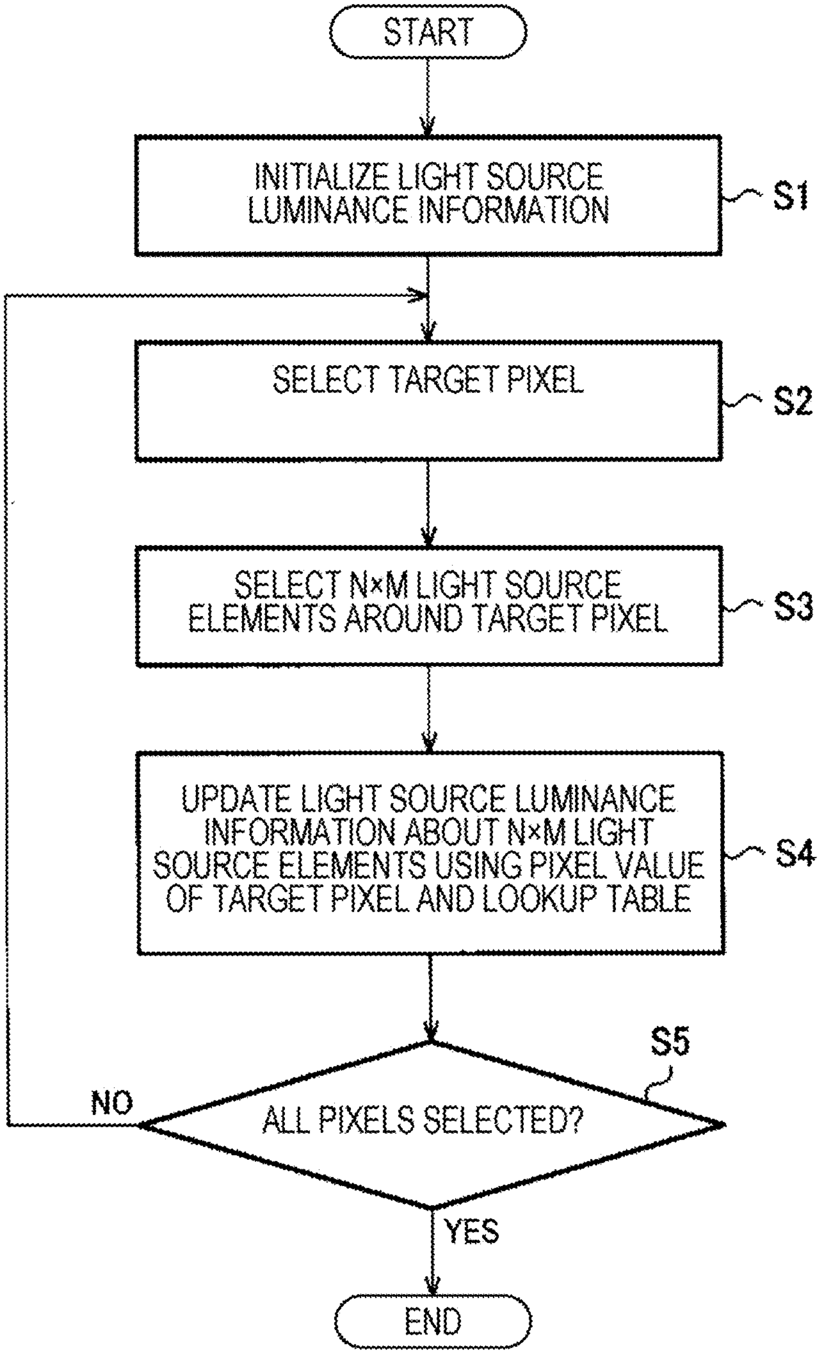
FIG. 12 shows a flowchart of a process performed by a dimming circuit.
Figure 13:
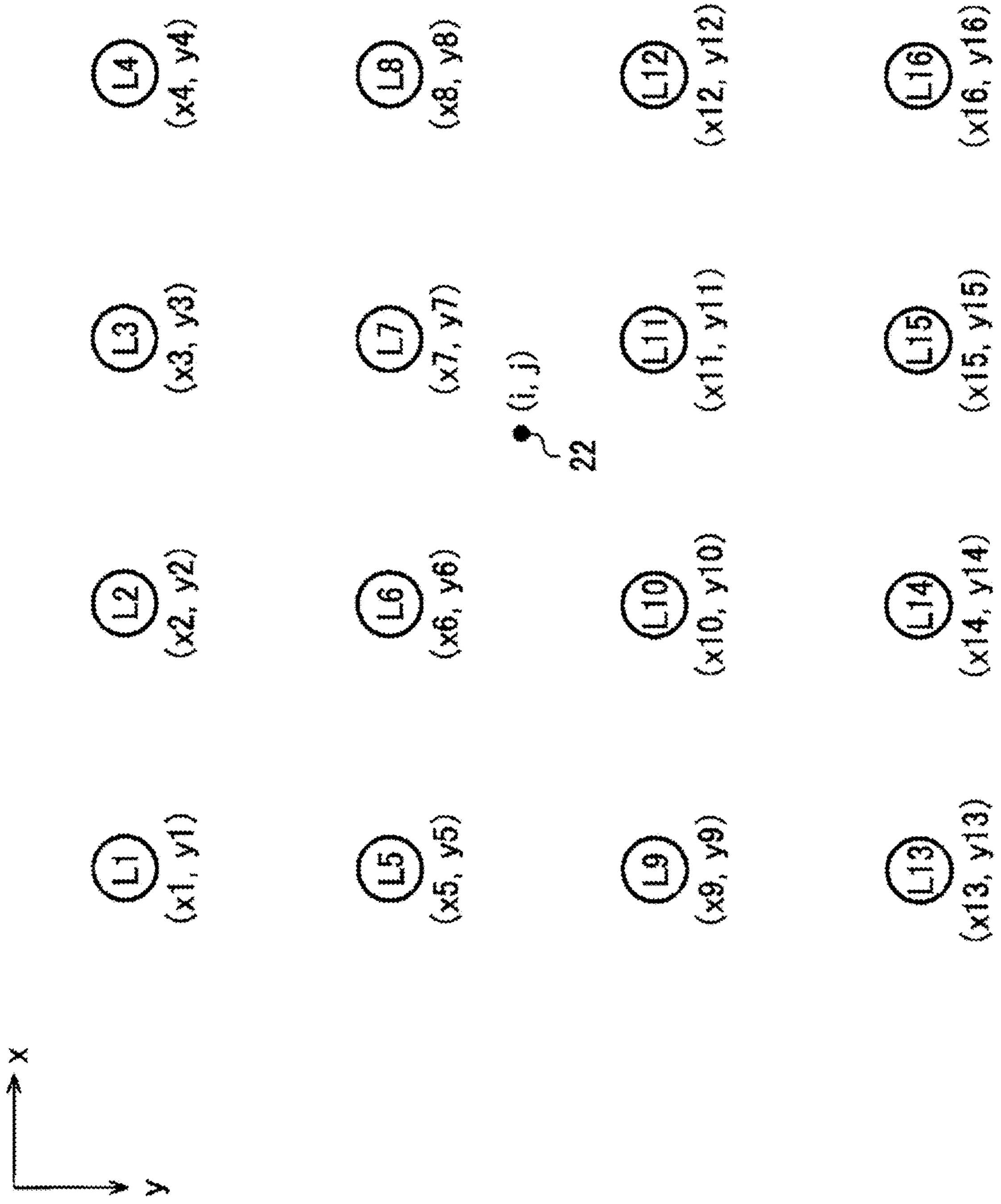
FIG. 13 shows an example of surrounding light source elements.

FIG. 12 is a flowchart of a process performed by the dimming circuit. Hereinafter, when the first detailed configuration example of FIG. 6 is used, the luminance information INT may be read as the luminance information BPL after the area boosting process. Further, below, an example of the surrounding light source elements shown in FIG. 13 will be used. In FIG. 13, the x direction is the horizontal scanning direction of the display panel, and the y direction is the vertical scanning direction of the display panel. Here, it is assumed that the luminance information INT is not downsampled and the number of pixels of the luminance information INT is the same as the number of pixels of the image data IMA. In this case, (x, y) in FIG. 13 are coordinates on the luminance information INT and are also coordinates on the input image. Note that when downsampling is performed, coordinates in the luminance information INT after downsampling may be used instead of (x, y) in the dimming process.

In step S1, the dimming circuit 150 initializes light source luminance information. In the first detailed configuration example of FIG. 6, for example, the luminance values of all light source elements are initialized to zero. In the second detailed configuration example of FIG. 9, the luminance value of each light source element is set to an initial value set by the area boosting circuit 140.

In step S2, the dimming circuit 150 selects one pixel from the pixels included in the luminance information INT. The selected pixel will be referred to as a target pixel. In the loop from step S2 to step S5, target pixels are sequentially selected. For example, in the first step S2, the first pixel of the first scanning line of the luminance information INT is selected, and in the subsequent step S2, the second pixel, the third pixel, . . . are sequentially selected, and after all pixels of the first scanning line are selected, the pixels of the second scanning line are sequentially selected, and this process is repeated until the final scanning line.

In step S3, the dimming circuit 150 selects n×m light source elements around the target pixel. The n×m light source elements are also referred to as surrounding light source elements. Each of n and m may be an integer greater than or equal to two.

As shown in FIG. 13, the position of a target pixel 22 is assumed to be (i, j). i and j are integers, and the position (i, j) indicates the i-th pixel of the j-th scanning line. In the example of FIG. 13, n=m=4. The dimming circuit 150 selects the light source elements L1 to L16 in the two most neighboring columns in the +x direction and the −x direction and the two most neighboring rows in the +y direction and the −y direction with reference to the position (i, j). When k is an integer greater than or equal to one and less than or equal to sixteen, the position of a light source element Lk is expressed as (xk, yk)

In step S4 of FIG. 12, light source luminance information about each light source element of the n×m light source elements selected in step S3 is updated using the pixel value of the target pixel 22 in the luminance information INT and the attenuation factor distribution information 171 stored in the storage unit 170.

In step S5, the dimming circuit 150 determines whether all pixels have been selected as target pixels, and when all pixels have been selected, the process ends and when there are any pixels that have not been selected, the process returns to step S2.

The update process of light source luminance information in step S4 will be described. The dimming circuit 150 calculates a required change amount $\Delta_{ij}$ indicating an amount of change required for the amount of light received by the target pixel 22 from the light source elements L1 to L16 using the following equation (1).

$$\Delta_{ij} = INT_{ij} - \sum_{k=1}^{16} lsf(k) \times powc(k) \tag{1}$$

In the above equation (1), INTij is the luminance value of the target pixel 22 in the luminance information INT. As described above, the luminance value is the maximum value among the RGB pixel values of the target pixel 22 in the image data IMA. Alternatively, the luminance value may be a luminance value calculated by multiplying the RGB pixel value of the target pixel 22 in the image data IMA by a coefficient, such as Y in YCrCb space, for example. lsf(k) is the attenuation factor of the light with which the light source element Lk illuminates the target pixel 22, and is determined from an actual attenuation factor distribution or an attenuation factor distribution that approximates the actual attenuation factor distribution. The dimming circuit 150 obtains lsf(k) using the attenuation factor distribution information 171. The attenuation factor distribution information 171 is a lookup table or a function. powc(k) is the previous light source luminance information about the light source element Lk. The previous light source luminance information is light source luminance information calculated using the previous target pixel that was selected immediately before the current target pixel 22. The previous target pixel is a pixel at the position (i−1, j) by one position before position (i, j) in the x direction.

The dimming circuit 150 updates the light source luminance information by distributing the required change amount $\Delta_{ij}$ to the light source luminance information about the light source element Lk using the following equation (2).

$$powu(k) = \begin{cases} powc(k) + \Delta_{ij}\dfrac{lsf(k)}{\sum_{\alpha=1}^{16} lsf(\alpha)}, & \text{if } \Delta_{ij} > 0 \\ powc(k), & \text{if } \Delta_{ij} \leq 0 \end{cases} \tag{2}$$

In the above equation (2), powu(k) is the current light source luminance information, that is, the updated light source luminance information.

Figure 14:
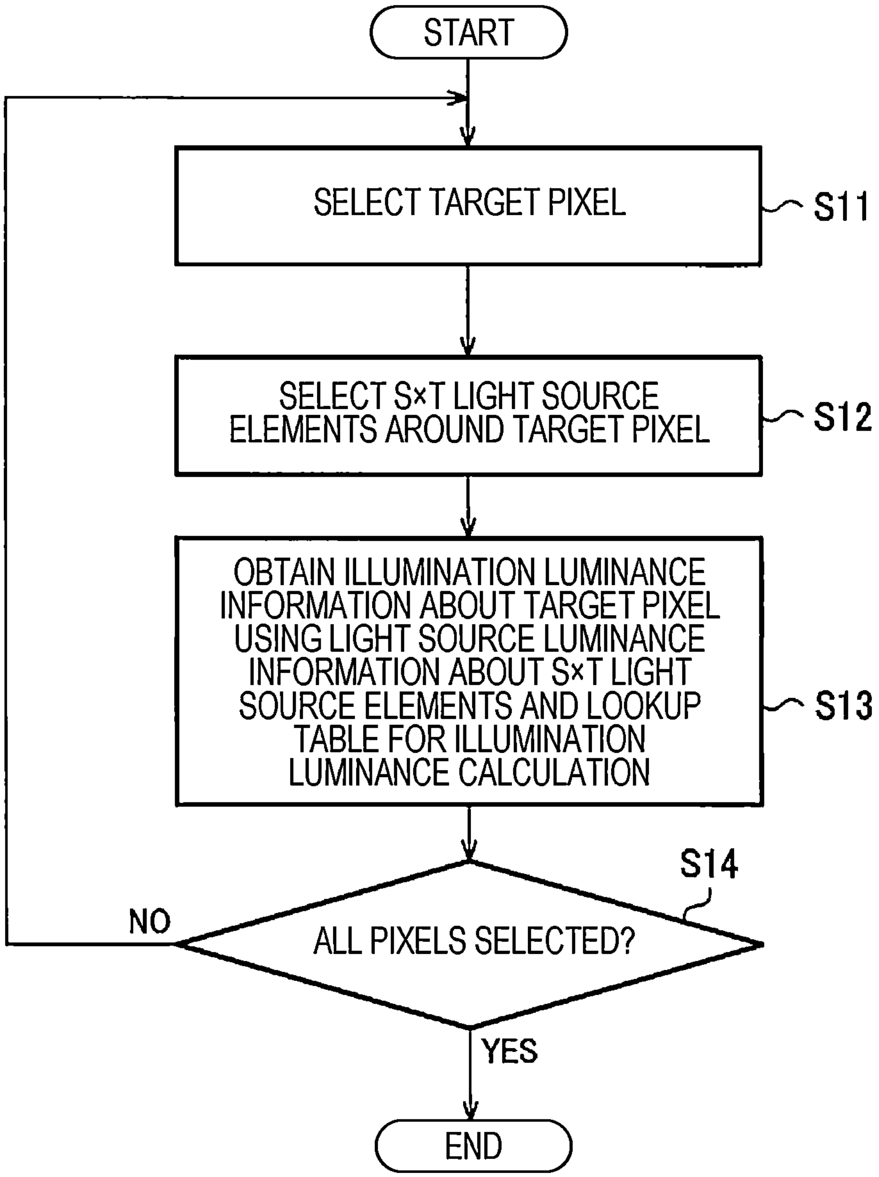
FIG. 14 shows a flowchart of an illumination luminance calculation process performed by a color correction circuit.

FIG. 14 shows a flowchart of an illumination luminance calculation process performed by the color correction circuit. Although the example of FIG. 13 is used here again, the process performed by the color correction circuit 120 is a separate process from the process performed by the dimming circuit 150. Furthermore, in the description of the dimming circuit 150, (x, y) is used as the coordinates on the luminance information INT, but here (x, y) are the coordinates on the input image indicated by the image data IMA.

In step S11, the color correction circuit 120 selects one pixel from the pixels included in the image data IMA. The selected pixel will be referred to as a target pixel. In the loop from step S11 to step S14, target pixels are sequentially selected. For example, in the first step S11, the first pixel of the first scanning line of the image data IMA is selected, and in the subsequent step S11, the second pixel, the third pixel, . . . are sequentially selected, and after all pixels of the first scanning line are selected, the pixels of the second scanning line are sequentially selected, and this process is repeated until the final scanning line.

In step S12, the color correction circuit 120 selects s×t light source elements around the target pixel. The s×t light source elements are also referred to as surrounding light source elements. s and t may each be an integer greater than or equal to two. FIG. 13 shows an example where s=t=4.

It is assumed that the position of the target pixel 22 is (i, j). i and j are integers, and the position (i, j) indicates the i-th pixel of the j-th scanning line. The color correction circuit 120 selects the light source elements L1 to L16 in the two most neighboring columns in the +x direction and the −x direction and the two most neighboring rows in the +y direction and the −y direction with reference to the position (i, j). When β is an integer greater than or equal to one and less than or equal to sixteen, the position of a light source element Lβ is expressed as (xβ, yβ).

In step S13, the color correction circuit 120 obtains illumination luminance information about the target pixel using the light source luminance information about the selected s×t light source elements and the attenuation factor distribution information 171.

In step S14, the color correction circuit 120 determines whether all pixels have been selected as target pixels, and when all pixels have been selected, the process ends and when there are any pixels that have not been selected, the process returns to step S11.

The calculation process of illumination luminance information in step S13 will be described. The color correction circuit 120 obtains the illumination luminance information about the target pixel 22 using the following equations (3) and (4).

$$PL(i, j) = \sum_{\beta=1}^{s \times t} pow(\beta) \times lsf(\beta) \tag{3}$$

$$lsf(\beta) = lsf\left((i - x\beta)^2 + (j - y\beta)^2\right) \tag{4}$$

In the above equation (3), PL(i, j) is illumination luminance information for the pixel at the position (i, j). pow(β) is light source luminance information determined by the dimming circuit 150. lsf(β) is an attenuation factor of light with which the light source element Lβ illuminates the target pixel 22. The color correction circuit 120 obtains lsf(β) using the attenuation factor distribution information 171. In the above equation (4), the square of the distance is input to the lookup table, but the distance may be input to the lookup table.

Note that powu in the above equation (4) after the loop of steps S2 to S5 in the flow of FIG. 12 is executed until the last pixel of the luminance information INT is used as pow in the above equation (3). Note that even when the loop from steps S2 to S5 has not been executed until the last pixel of the luminance information INT, the update of the light source luminance information about the light source element will be completed sequentially according to advancement for the target pixel, so that the light source luminance information whose update was completed may be used as pow.

The color correction circuit 120 calculates the illumination luminance information about the target pixel from not only the light source luminance information about s×t light source elements around the target pixel but also the light source luminance information about all the light source elements of the backlight 210.

6. Third Detailed Configuration Example

Figure 15:
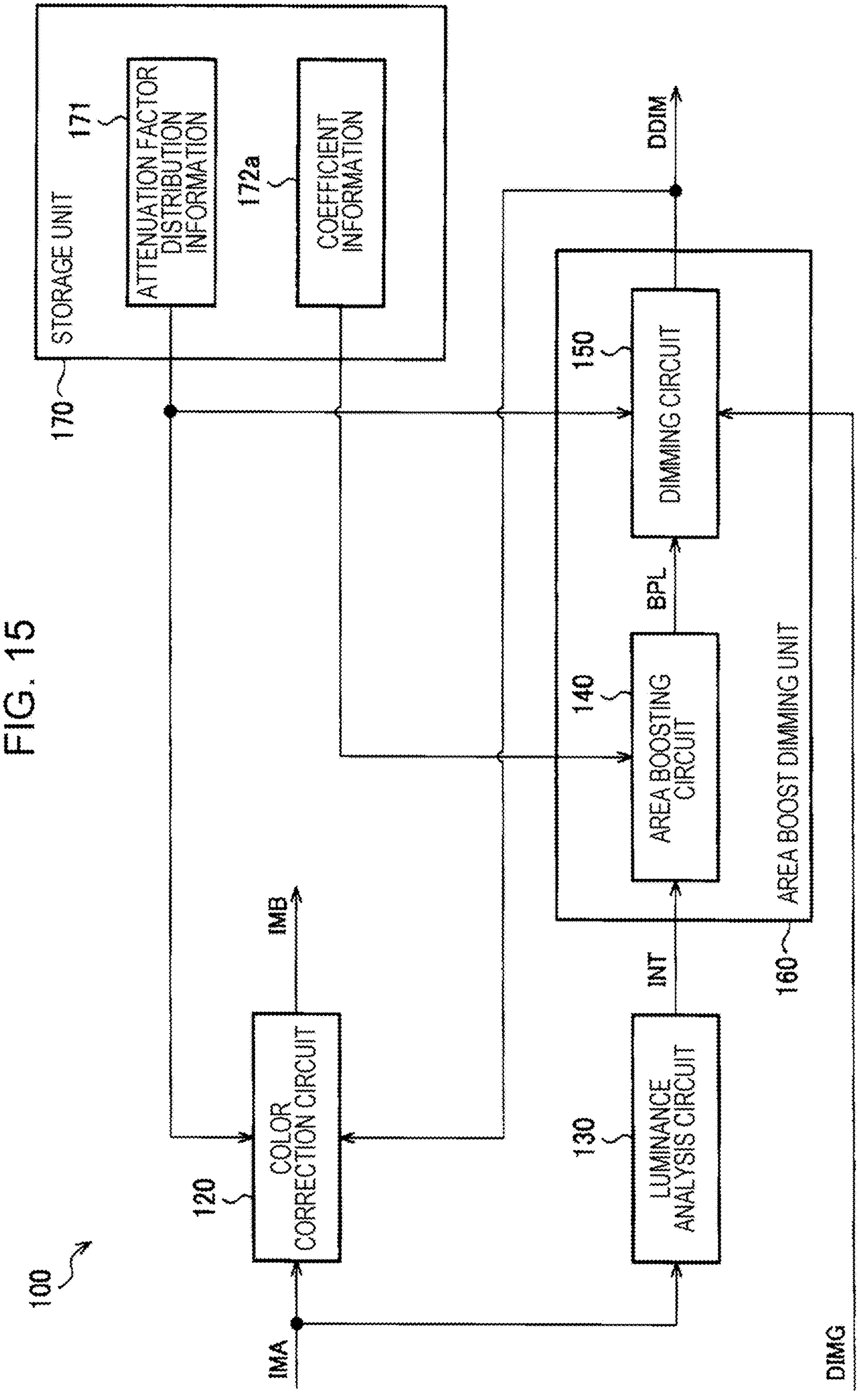
FIG. 15 shows a third detailed configuration example of a circuit device.

FIG. 15 shows a third detailed configuration example of the circuit device. In this configuration example, the global dimming process is performed in addition to the local dimming. Note that descriptions of components similar to those in FIG. 2, FIG. 6, or FIG. 9 will be omitted as appropriate. Although FIG. 15 shows an example in which the global dimming process is combined with the first detailed configuration example of FIG. 6, a similar global dimming process may be combined with the second detailed configuration example of FIG. 9.

The processing device 300 performs the global dimming process based on information about the amount of environmental light detected by an external light sensor or the like to transmit the result to the circuit device 100 as a global dimming parameter DIMG. However, the circuit device 100 may perform the global dimming process based on information about the amount of environmental light and obtain the global dimming parameter DIMG.

The dimming circuit 150 multiplies the light emission luminance of each light source element determined in accordance with the luminance information INT by the global dimming parameter DIMG. The global dimming parameter is, for example, greater than or equal to zero and less than or equal to one, and is common to the entire backlight 210. The dimming circuit 150 outputs light source luminance information indicating the light emission luminance of each light source element multiplied by the global dimming parameter as the light source luminance data DDIM.

In the present embodiment, the dimming circuit 150 determines the light source luminance information by performing the global dimming process based on the global dimming parameter DIMG on the light emission luminance of each light source element determined in accordance with the luminance information INT.

According to the present embodiment, the light emission luminance, of each light source element, on which the area boosting process is performed is multiplied by the global dimming parameter. As a result, the area boosting process, the dimming process in local dimming control, and the global dimming process can be combined. While the area boosting process enhances the visibility of a specific area, it is possible to dim the brightness of the entire screen depending on the brightness of the environment.

Although the present embodiment is described in detail as above, those skilled in the art will easily understand that many modifications can be made without substantially departing from the novelty and effects of the present disclosure. Therefore, all such modifications are intended to be included within the scope of the present disclosure. For example, a term described at least once in a specification or drawing with a broader or synonymous different term may be replaced by that different term anywhere in the specification or drawing. All combinations of the present embodiment and modifications are also included in the scope of the present disclosure. Further, the configurations, operations, and the like of the circuit device, the backlight, the display device, the display system, the processing device, the electronic device, and the like are not limited to those described in the present embodiment, and various modifications can be made.

What is claimed is:

1. A circuit device that controls a display device including a plurality of light source elements and a display panel, the circuit device comprising:

- a luminance analysis circuit that luminance analyzes image data of an input image to output luminance information;
- an area boosting circuit configured to:
  - determine whether a first area of the display panel is displayed in black based on the image data and the luminance information;
  - perform, when the area boosting circuit does not determine that the first area is displayed in black, an area boosting process on a first light source element of the plurality of light source elements corresponding to the first area to generate updated luminance information such that light emission luminance of the first light source element is higher than other light source elements of the plurality of light source elements; and
  - not perform the area boosting process on the first light source element when the area boosting circuit determines that the first area is displayed in black; and
- a dimming circuit that determines light source luminance information indicating the light emission luminance at which each light source element of the plurality of light source elements emits light in accordance with the luminance information, the updated luminance information, and attenuation factor distribution information, the attenuation factor distribution information indicating a relationship between a distance from one of the plurality of light source elements to a corresponding pixel of a plurality of pixels of the display panel and an attenuation factor of the light with which the one of the plurality of light source elements illuminates the corresponding pixel, wherein the plurality of light source elements are controlled based on the light source luminance information.

2. The circuit device according to claim 1, wherein the area boosting circuit performs the area boosting process of multiplying the luminance information in the first area by a first coefficient, and multiplying the luminance information in a second area of the input image by a second coefficient, the second area being different from the first area, and wherein the dimming circuit determines the light source luminance information based on the updated luminance information after the area boosting process.

3. The circuit device according to claim 2, wherein the first coefficient is larger than the second coefficient.

4. The circuit device according to claim 2, wherein when the area boosting process is not performed, the first coefficient has a same value as the second coefficient.

5. The circuit device according to claim 1, wherein the area boosting circuit performs the area boosting process of setting the light emission luminance of the first light source element to a predetermined boost luminance value.

6. The circuit device according to claim 5, wherein the dimming circuit fixes the light emission luminance of the first light source element to the predetermined boost luminance value, and determines the light emission luminance of a second light source element of the plurality of light source elements corresponding to a second area of the input image, the second area being different from the first area, in accordance with the luminance information.

7. The circuit device according to claim 5, wherein the predetermined boost luminance value is a maximum value of light emission luminance of a light source element of the plurality of light source elements.

8. The circuit device according to claim 1, wherein the area boosting circuit performs the area boosting process on the first area when determining that a predetermined icon is displayed in the first area.

9. The circuit device according to claim 1, wherein the dimming circuit determines the light source luminance information by performing a global dimming process based on a global dimming parameter on the light emission luminance of each light source element of the plurality of light source elements determined in accordance with the luminance information.

10. The circuit device according to claim 1, further comprising:

a color correction circuit that color corrects the image data based on the light source luminance information.

11. The circuit device according to claim 1, wherein the area boosting circuit is further configured to switch between ON and OFF of the area boosting process based on a register setting.

12. The circuit device according to claim 1, wherein the area boosting circuit is further configured to perform the area boosting process by multiplying the luminance information of the first area by a coefficient greater than 0.5.

13. The circuit device according to claim 1, wherein the area boosting circuit is further configured to set an initial value of the light emission luminance of the first light source element corresponding to the first area to a predetermined boost luminance value prior to dimming.

14. The circuit device according to claim 1, wherein the area boosting circuit is further configured to set a same coefficient value for all areas of the display panel when the area boosting function is turned OFF.

15. A display system comprising:

the circuit device according to claim 1; and the display device.

16. A display system comprising:

a display device including a plurality of light source elements and a display panel; and a display controller configured to control the display device, the display controller being further configured to:

luminance analyze image data of an input image to output luminance information;

determine whether a first area of the display panel is displayed in black based on the image data and the luminance information;

perform, when the area boosting circuit does not determine that the first area is displayed in black, an area boosting process on a first light source element of the plurality of light source elements corresponding to the first area to generate updated luminance information such that light emission luminance of the first light source element is higher than other light source elements of the plurality of light source elements;

not perform the area boosting process on the first light source element when the area boosting circuit determines that the first area is displayed in black; and determines light source luminance information indicating the light emission luminance at which each light source element of the plurality of light source elements emits light in accordance with the luminance information, the updated luminance information, and attenuation factor distribution information, the attenuation factor distribution information indicating a relationship between a distance from one of the plurality of light source elements to a corresponding pixel of a plurality of pixels of the display panel and an attenuation factor of the light with which the one of the plurality of light source elements illuminates the corresponding pixel, wherein the plurality of light source elements are controlled based on the light source luminance information.

17. The display system according to claim 16, wherein the light emission luminance of the first light source element is a fixed luminance value that does not depend on the image data.

* * * * *